Inventors
Howard C. Mead &
Clarence A. Michel
By Blackmore, Spencer & Flint
Attorneys Jan. 15, 1935.  H. C. MEAD ET AL  1,987,697
HEAD LAMP
Filed Aug. 29, 1932     9 Sheets-Sheet 7

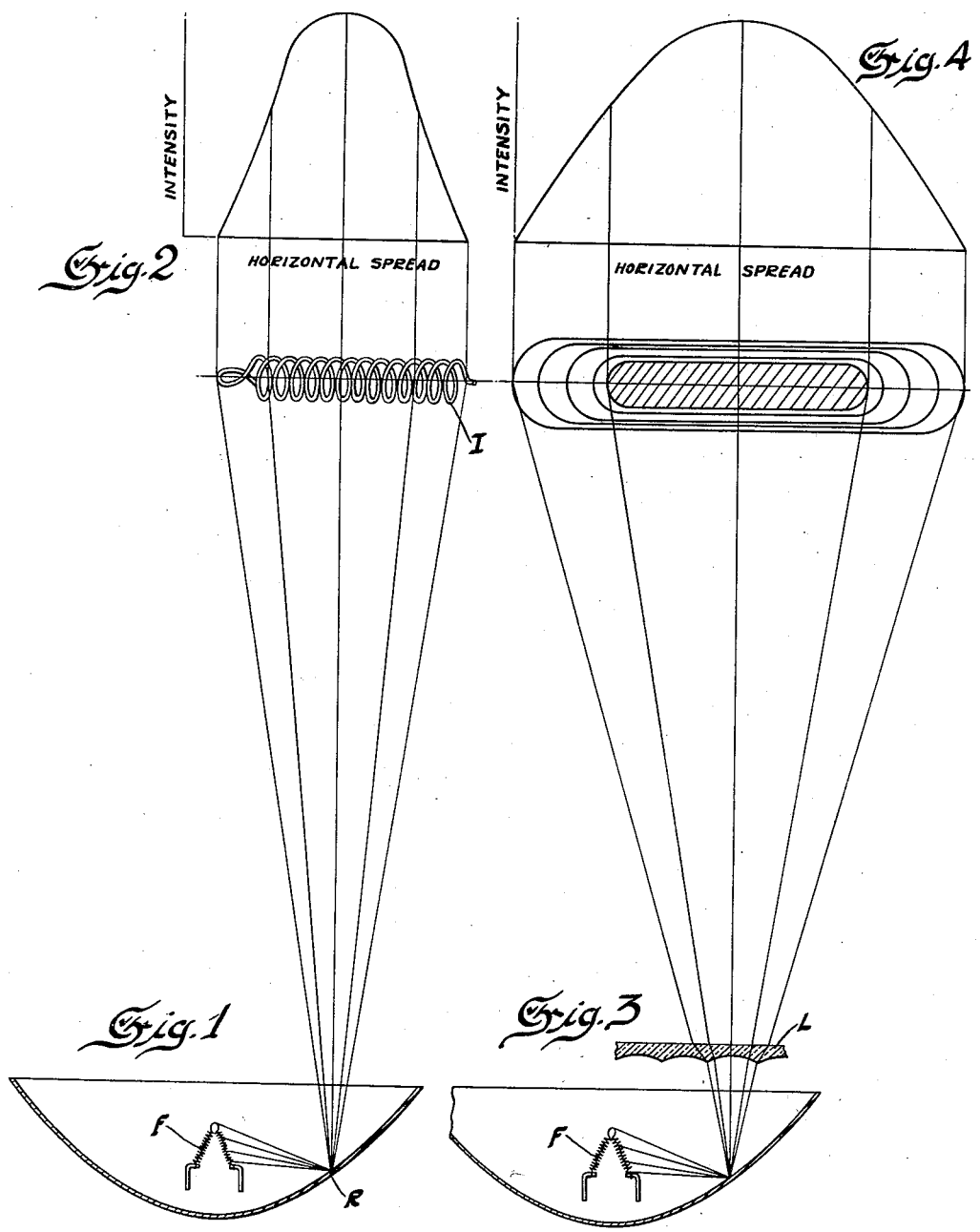

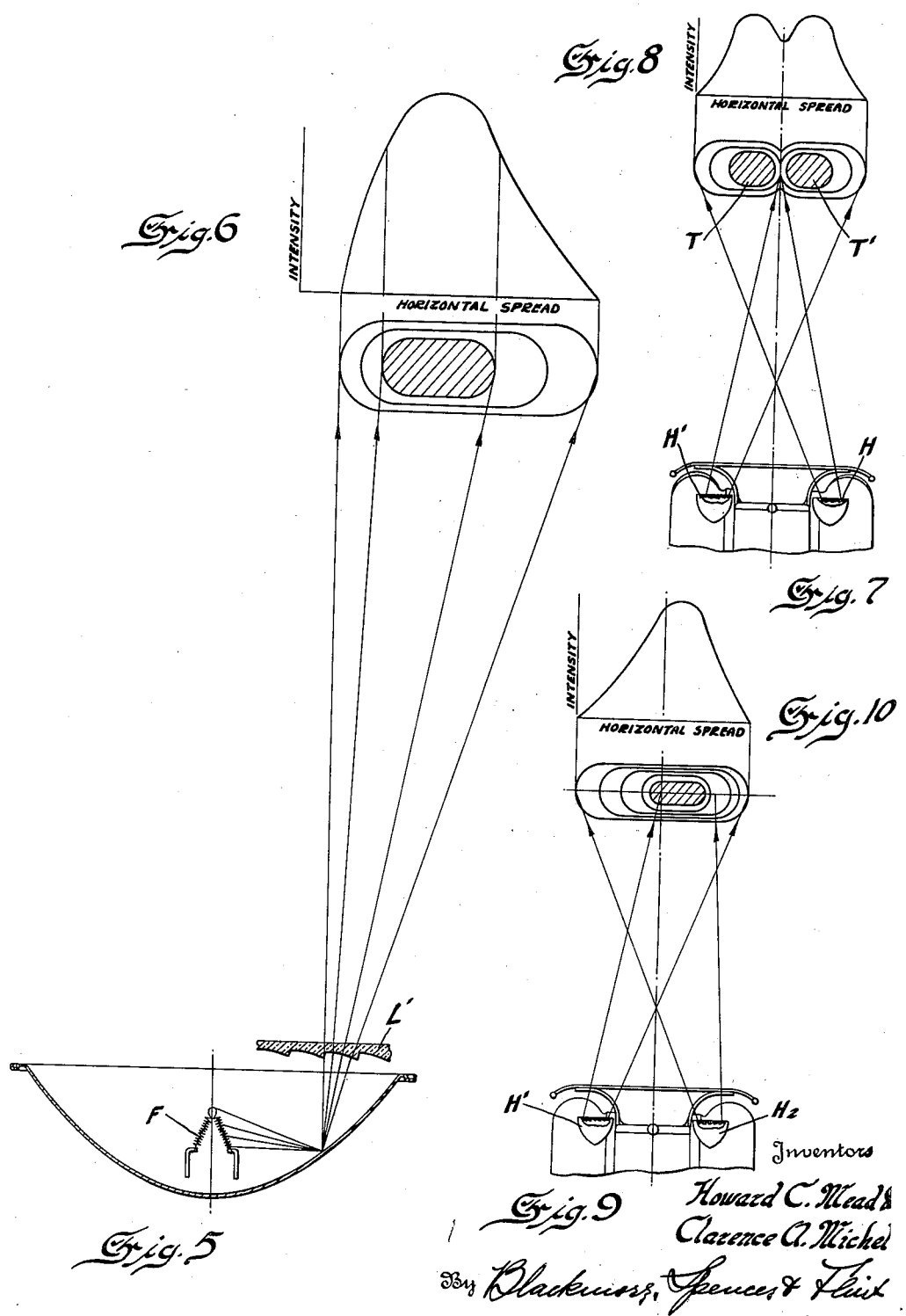

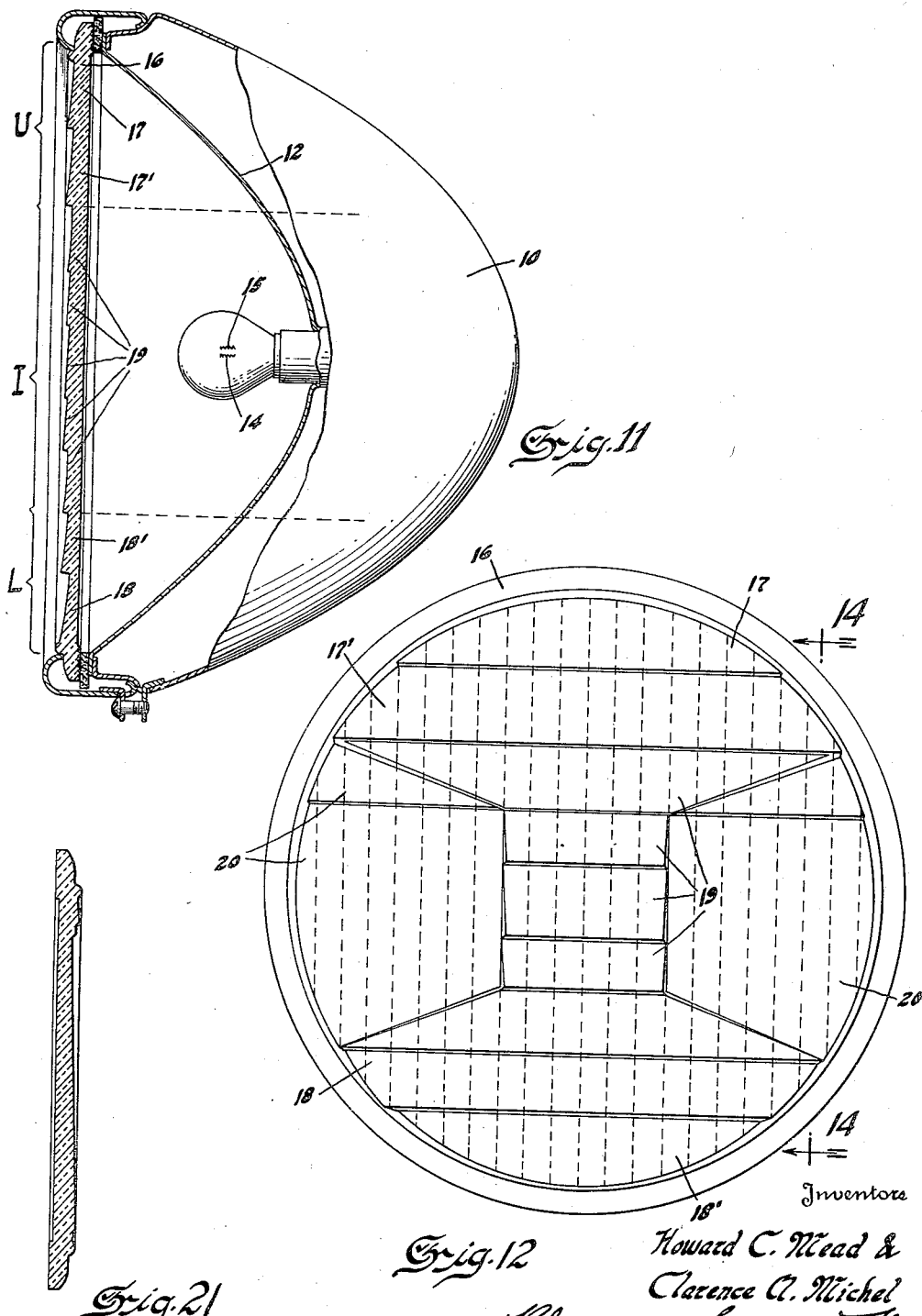

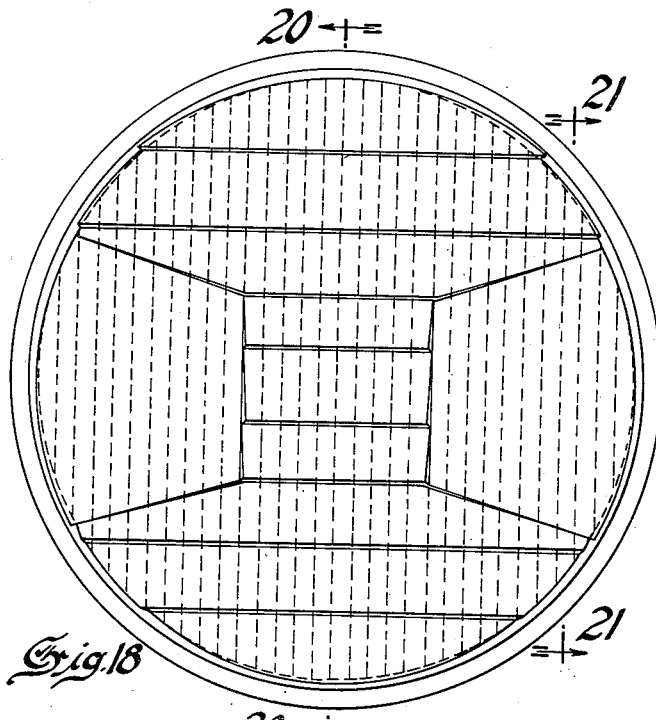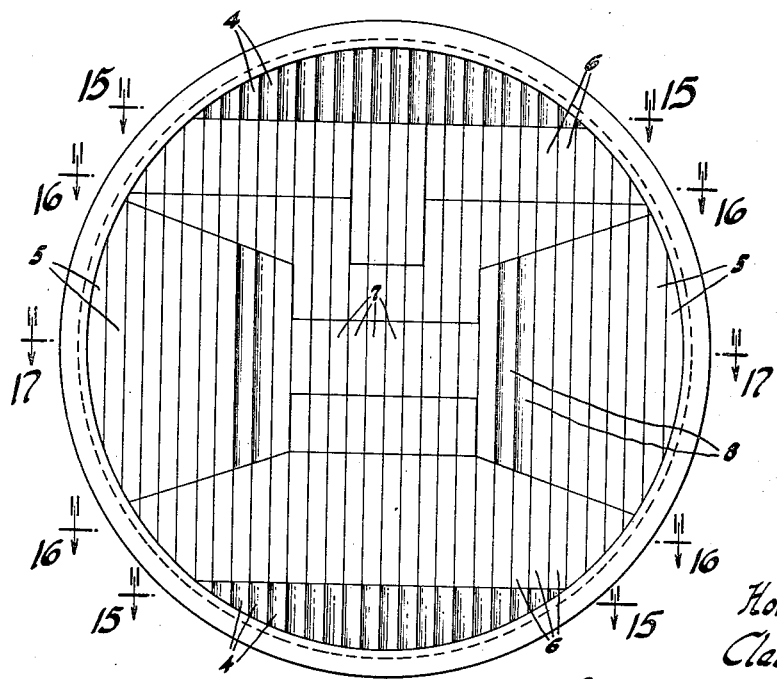

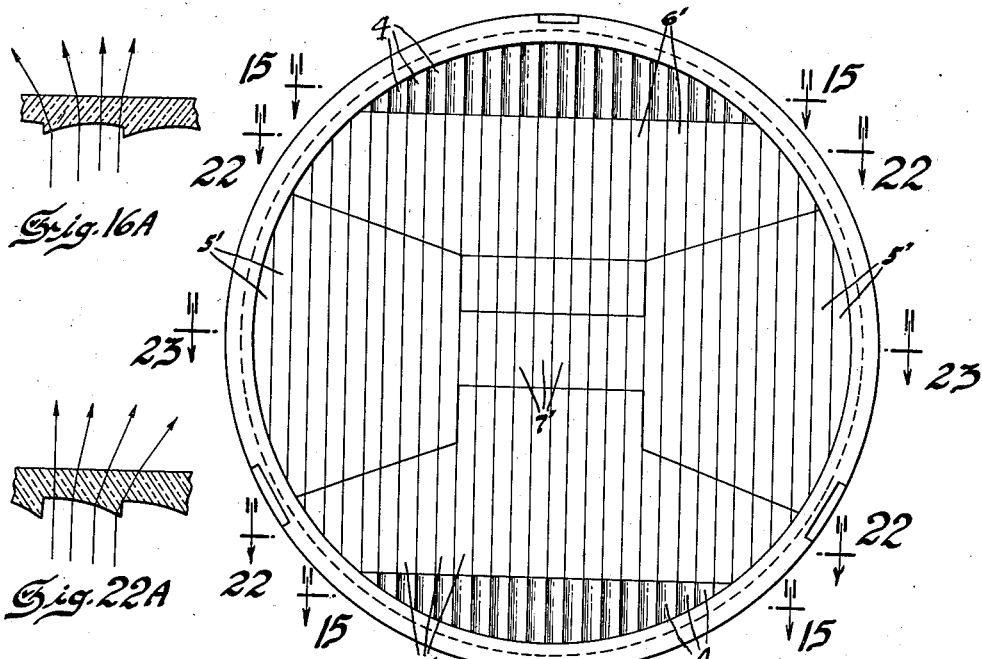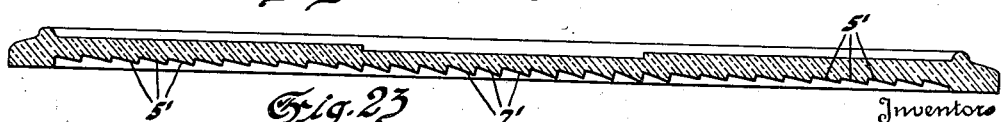

Inventors
Howard C. Mead &
Clarence A. Michel
By Blackmore, Spencer & Flint
Attorneys Jan. 15, 1935.     H. C. MEAD ET AL     1,987,697
HEAD LAMP
Filed Aug. 29, 1932     9 Sheets-Sheet 8

Inventors
Howard C. Mead
& Clarence A. Michel
By Blackmore, Spencer & Flint
Attorneys Jan. 15, 1935. H. C. MEAD ET AL 1,987,697
HEAD LAMP
Filed Aug. 29, 1932 9 Sheets-Sheet 9

Inventors
Howard C. Mead &
Clarence A. Michel
By Blackmore, Spencer & Flint
Attorneys Patented Jan. 15, 1935

1,987,697

UNITED STATES PATENT OFFICE 1,987,697

HEAD LAMP

Howard C. Mead and Clarence A. Michel, Anderson, Ind., assignors, by mesne assignments, to General Motors Corporation, Detroit, Mich., a corporation of Delaware Application August 29, 1932, Serial No. 630,809

9 Claims. (Cl. 240—41.25)

This invention has to do with automobile head-lighting and is an improvement on the inventions described and claimed in the prior Patent No. 1,929,111, granted to Falge and Godley on October 3, 1933.

Headlamps capable of producing at least two beams, one a high or "driving" beam for driving in the country at high speed when no cars are approaching, and the other a low or "passing" beam designed to relieve the driver of an approaching car of glare, have been found to be most desirable. It has now been found sufficient if the left side only of the "driving" beam is dropped for it is this part of the beam that is likely to reach the eyes of the driver of an approaching car. It is furthermore highly desirable that the height of the right hand side of the beam should be maintained to permit safe passing at present day speeds, as well as to adequately illuminate the ditch and the side of the road where people are accustomed to walk.

The only headlighting system that has so far gone into use embodying these features is described as the preferred form in the said Falge and Godley application, and involves the use of a special three filament bulb, having its position in one lamp reversed with respect to its position in the other, thereby requiring the reversal of sockets and a different location of the socket apertures in the reflectors of the two lamps as well as different wiring. This lack of standardization of parts adds to the cost of production, and to the difficulties of service in the field. Our headlighting system is characterized by use of the same parts in both lamps except for the lens which controls the horizontal distribution of light. The bulb employed is the standard two filament bulb now in almost universal use, and for sale at service stations throughout the country.

Our system is likewise characterized by beams having substantially the same intensity across the width of the road as contrasted with prior designs in which several times as much light is placed on the right side of the road as on the left side.

An important feature of our invention consists in so overlapping the beams from the two headlamps that the light of highest intensity is projected substantially down the center of the road. This has been accomplished by forming the top of the beam of light from both headlamps, the light from one headlamp being confined to the right of the center line while the light from the other headlamp forms the left side of the top of the beam and is spread a few degrees beyond the center line to the right so that its maximum intensity is substantially on the center line. With this arrangement when the overlapping beam is depressed the left side of the composite beam is dropped, relieving the approaching driver of glare, while the right side of the road remains illuminated a long way in advance, substantially as before. We have found it desirable that the amount of overlap be held at the minimum necessary to build up the intensity down the center of the road so that the bulk of the light in the overlapping beam will be directed to the left of the road producing a well-balanced composite beam.

The overlapping of the beams is also important in that it renders the equipment insensitive to variations in lateral positioning of the filaments, insuring a blended beam free from dark areas at all times.

Our invention is susceptible of a great many variations in practice. Thus, while we prefer to criss-cross the beams from the two headlamps, each lamp may provide the top of the beam for its own side of the road. The light from each lamp may be confined entirely to one side of the road, but we prefer to spread the light at the bottom of each of the beams all the way across the road. We may employ the conventional filament arrangement consisting of one filament on focus and one above, or we may provide several filaments side by side on a horizontal plane through the focus with the usual upper filament. If light is desired above the horizontal, we may provide an additional filament located below the focus and this filament may have any preferred shape.

The invention may be embodied in the reflector alone; in a special reflector combined with a special lens, or in a special lens used with a plain parabolic reflector, these optical elements being well known equivalents in headlamp design. Choice between them is usually dictated by convenience in manufacture.

Figure 1 is a diagrammatic view showing how an image of the filament is projected from a point on the reflector, while Figure 2 shows the distribution of light along the image.

Figure 3 is a view like Figure 1 but showing the effect on the image of using a lens having full flutes. Figure 4 shows the corresponding intensity curve.

Figure 5 is a view like Figure 1 but showing the effect of the use of a lens having half flutes.

Figure 6 shows the corresponding intensity curve.

Figure 7 is a diagrammatic view showing how a dark central area appears in the beam pattern when the light from each headlamp is restricted to one side of the road. Figure 8 shows the corresponding intensity curve.

Figure 9 is a view like Figure 7 showing how the dark area is eliminated by spreading the left hand beam of Figure 7 over on to the right of the road. Figure 10 shows the corresponding intensity curve.

In Figures 11 to 23 we have illustrated headlamps embodying a parabolic reflector, and a special lens having both flutes and prisms.

Figures 11 to 17 show details of the right headlamp, while Figures 18 to 23 show details of the left headlamp.

Figure 11 is a vertical section through the right headlamp.

Figure 12 is a front view of the right headlamp lens, while Figure 13 is a rear view of the right lens.

Figure 14 is a vertical section on line 14—14 of Figure 12.

Figure 15 is a horizontal section taken on either of the section lines 15—15 of Figure 13 or of Figure 19.

Figure 16 is a horizontal section on line 16—16 of Figure 13.

Figure 16A is a horizontal section through one of the asymmetrical flutes of the right hand lens shown in Figure 13 illustrating the action of the flute on the light rays.

Figure 17 is a section on line 17—17 of Figure 13.

Figure 18 is a front view of the lens of the left headlamp, while Figure 19 is a rear view.

Figures 20 and 21 are vertical sections on the corresponding lines of Figure 18.

Figure 22 is a horizontal section on the corresponding line of Figure 19.

Figure 22a is a horizontal section through one of the asymmetric flutes of the left hand lens shown in Figure 19, illustrating the action of the flutes on the light rays.

Figure 23 is a horizontal section on the corresponding line of Figure 19.

Figure 24:
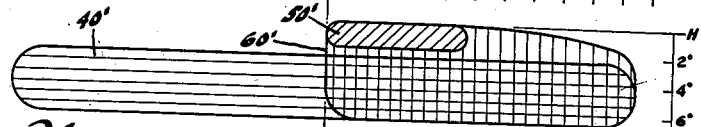
Figure 25:
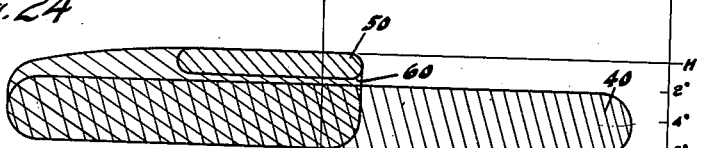

Figure 24 shows the beam pattern produced by the lower filament of the left lamp, while Figure 25 shows the pattern produced by the lower filament of the right lamp.

Figure 26:
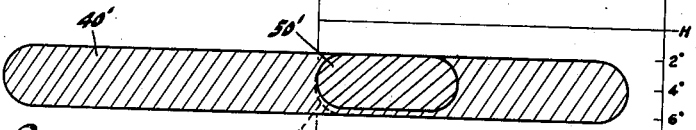
Figure 27:
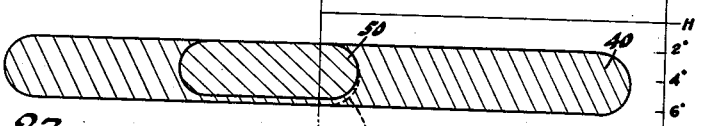

Figures 26 and 27 show the beam patterns produced by the upper filaments of the left and right lamps, respectively.

Figure 28:
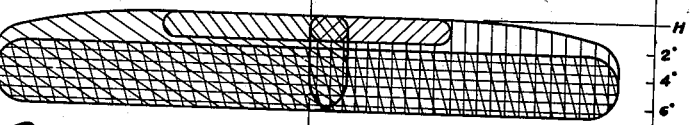
Figure 29:
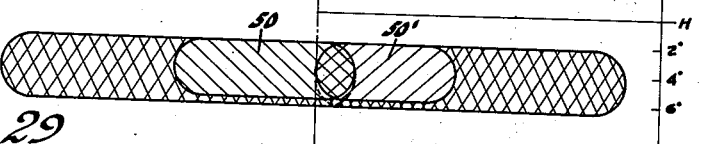

Figure 28 illustrates the beam pattern produced by the lower filaments of the two lamps, while Figure 29 shows the beam pattern produced by the upper filaments of the lamps.

Figure 30:
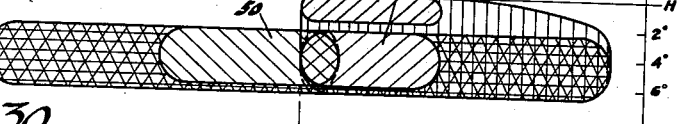

Figure 30 shows the beam pattern produced by the lower filament of the left lamp combined with the upper filaments of both lamps.

Figure 31:
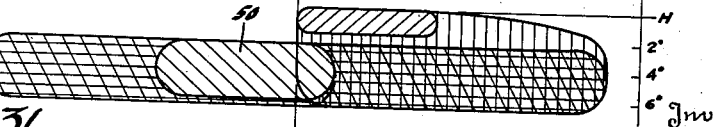

Figure 31 shows the beam pattern produced by the upper filament of the right lamp together with the lower filament of the left lamp.

Figures 32 to 40 illustrate the embodiment of our invention in headlamps provided with a special reflector as well as a special lens.

Figure 32:
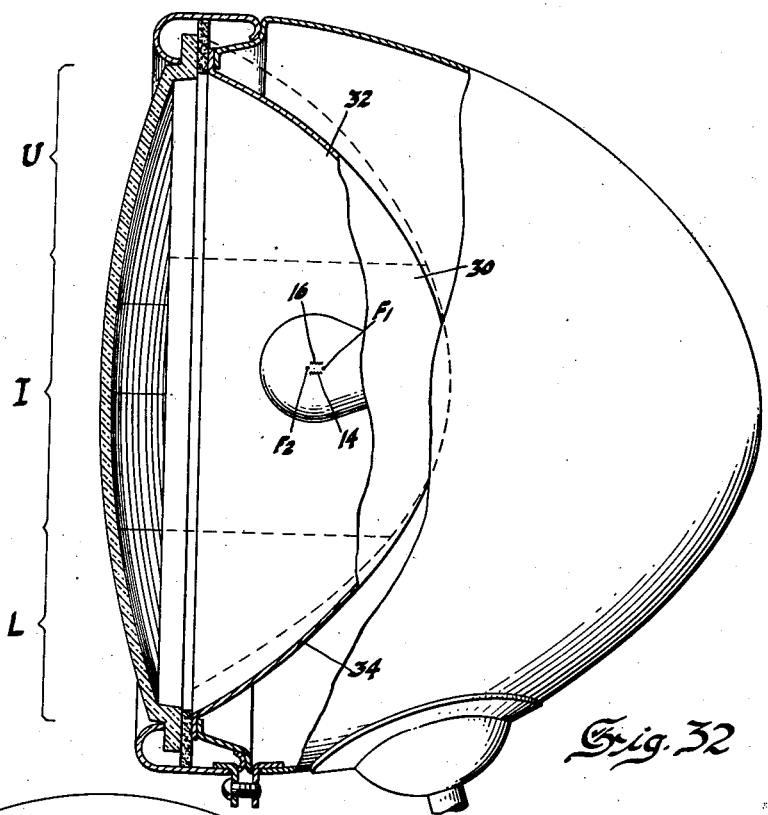

Figure 32 is a vertical section through one of the headlamps.

Figure 33:
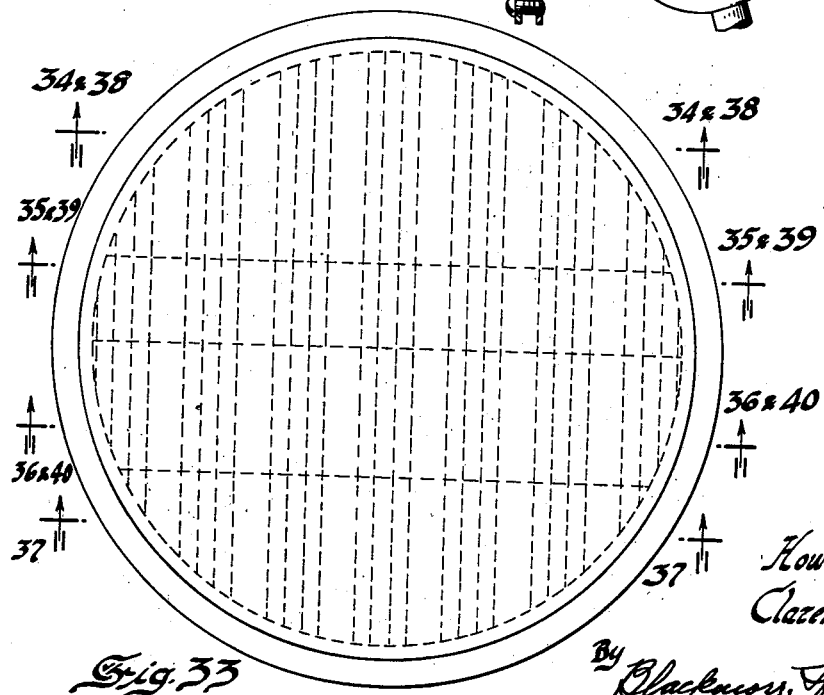

Figure 33 is a front view of the headlamp lens.

Figures 34, 35, 36 and 37 are horizontal sections on the corresponding lines of Figure 33, showing the construction of the lens of the right headlamp.

Figure 34:
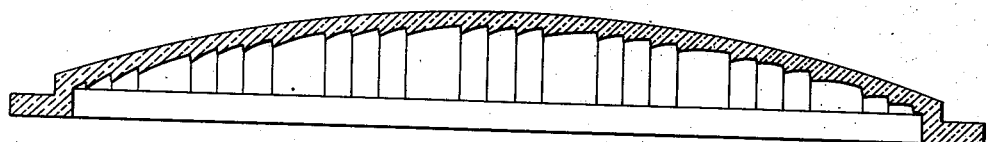
Figure 35:
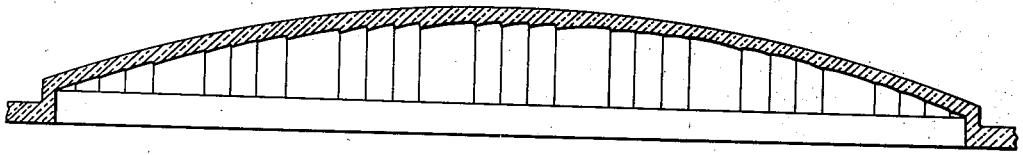
Figure 36:
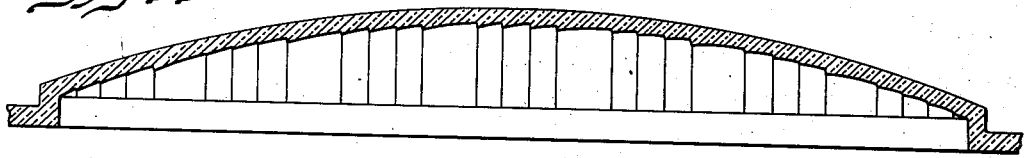
Figure 38:
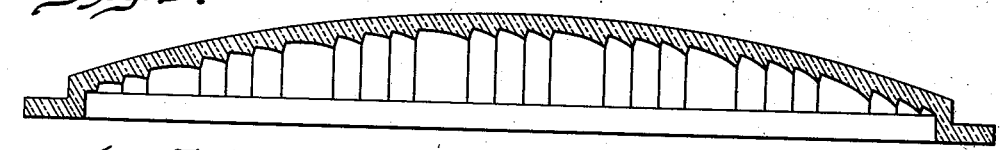
Figure 39:
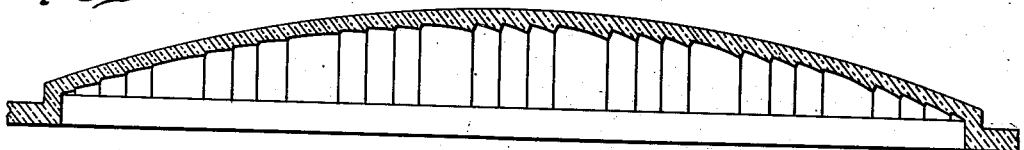
Figure 40:
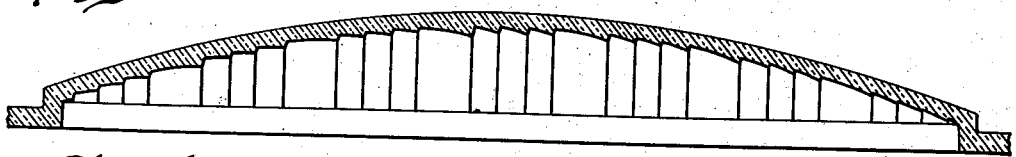

Figures 38, 39 and 40 are horizontal sections through the lens of the left headlamp taken on the same section lines as Figures 34, 35 and 36, respectively.

Figure 41:
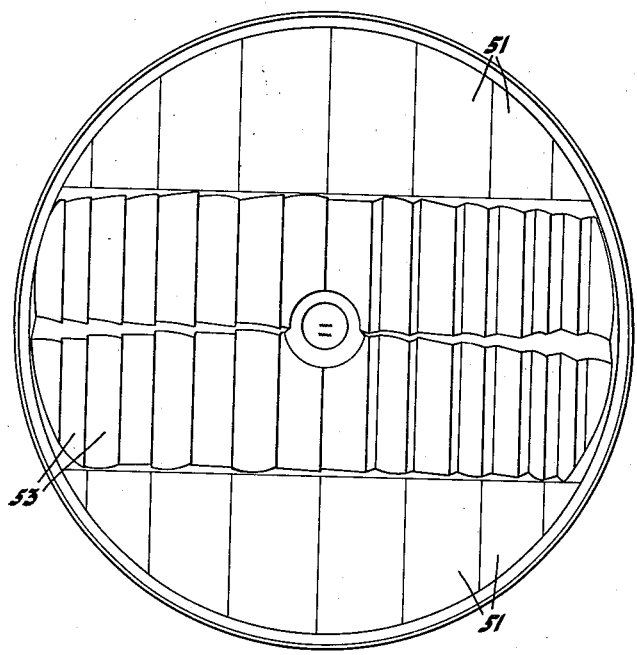
Figure 42:
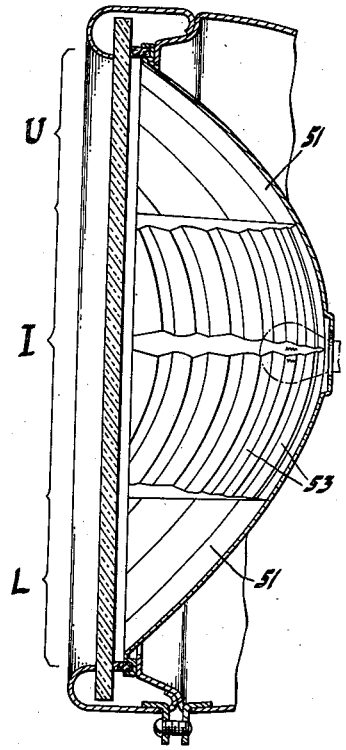
Figure 43:
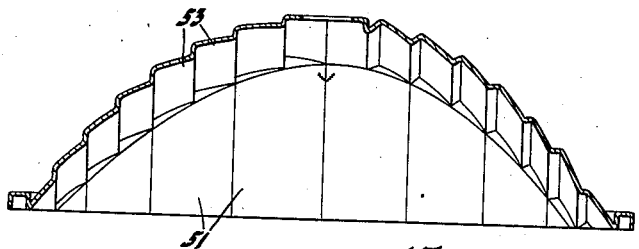

Figures 41, 42 and 43 show the application of our invention to a headlamp having a special reflector with a plain glass cover, Figure 41 being a front view of the reflector, Figure 42 a vertical section through the lamp, and Figure 43 a horizontal section through the reflector adjacent the center thereof.

In Figures 1 to 10 we have endeavored to set forth considerations which led us to the principle of overlapping which is an important feature of our invention.

In Figure 1 we have shown in an exaggerated way the reflection of the image of a filament F of standard shape arranged at the focus of a parabolic reflector R. The image of the filament is indicated at I.

In Figure 2 we have plotted the intensity of illumination along the length of the image. It will be noted that the intensity decreases rapidly as the ends of the image are approached. In the case of the looped end of the filament this is due to the smaller quantity of wire and to the fact that the isolated loop is somewhat better cooled. In the case of the opposite end of the filament the reduction in intensity is due to cooling by the conductivity of the lead wires.

In Figure 3 we have shown diagrammatically the effect produced on the image I of Figure 1 by employing a full flute on lens L. The effect of the flute is to spread the image of each of the turns of filament wire so that they overlap, producing a blended beam, such as shown in the figure. It will be noted that the region of greatest intensity remains in the center of the beam just as in the case of the filament image of Figure 1.

In Figure 4 we have plotted the intensity along the length of the image.

In Figure 5 we have shown in like manner the effect produced on the image by the use of half flutes on lens L'. The effect of the half flute is to displace the filament image to the right of the centerline, and to spread the images of the individual coils so that they overlap to produce a blended beam. However, it will be noted that the distribution of light in the image remains substantially the same as in the preceding figures in that the region of maximum intensity is considerably removed from the margins of the beam. The light distribution is illustrated by the curve of Figure 6. It will be apparent that this distribution results from the filament design itself as explained in connection with Figure 1.

The images shown in Figures 1, 3 and 5 are images projected from but one small portion of the reflector. The beam projected by any reflector is composed of an infinite number of such images. Since each image will necessarily be of higher intensity in its central portion, the beam, which is a composite of all the images, will likewise be of greater intensity at regions remote from its margins. This characteristic flows from the filament design itself.

The image of the filament shown in Figure 5 also serves to illustrate the beam projected by the headlamp of Figure 5, for the distribution of light through the beam will be found to be substantially the same as that along the image.

Now in the design of asymmetrical headlighting systems it is essential that the light at the top of the right hand side of the beam should be substantially confined to that area so that when the left side of the top of the beam is depressed the approaching driver is relieved from glare. To accomplish this it is essential that the filament images forming the top of the right hand side of the beam should within practical limits lie wholly to the right of the centerline. This makes it inevitable that the portion of the beam of highest intensity will be displaced to the right of the centerline, the displacement being usually from 2° to 4°.

If the top of the left hand side of the beam should be similarly designed, as proposed in the Falge and Godley application referred to, the region of maximum intensity will be displaced from 2 to 4° to the left of the centerline. The result will be a beam having maximum intensity at the sides of the road with a relatively dark space at the center of the road where intense illumination is most needed. We have illustrated this condition diagrammatically in Figure 7. Here the right headlamp H projects a beam to the left side of the road with maximum intensity at the region indicated at T. The left headlamp H' projects a beam having the maximum intensity at T'. The resultant dark area between them is shown in Figure 8 by the dip in the central portion of the intensity curve. The portion of the beam going straight down the road is the portion which illuminates objects at the greatest distance, and should accordingly have the highest intensity. In the beam shown in Figure 7 the point of maximum intensity is not at the center; therefore, this beam is deficient in light where it is needed most.

The principle of our improved headlamp design is illustrated in Figure 9. We have succeeded in projecting light of the greatest intensity substantially down the center of the road while, at the same time, insuring that the top of the right hand side of the beam is made up of filament images, none of which extend to the left of the centerline. In Figure 9 the left headlamp H' projects its light to the right of the road in substantially the same manner as the headlamp H' of Figure 7. However, the right headlamp H2 projects its light not only over the left side of the road as in the case of the lamp H of Figure 7, but also from 1° to 5° to the right of the centerline. This degree of overlapping makes it possible to design the right headlamp so that the projected beam has its maximum intensity substantially on the centerline. The resultant distribution in the combined beam is shown in Figure 10. It will be noted that the maximum intensity in the beam has been materially increased and that the point of maximum intensity is very close to the centerline. The intensity of illumination along the centerline is very close to the maximum intensity as contrasted with the low intensity illumination produced by the design of Figure 7. The far reaches of the road are consequently very satisfactorily illuminated.

In the remaining drawings and descriptions we are illustrating a number of ways of carrying this invention into practice in connection with a headlighting system designed to produce either a high beam, an asymmetrical beam, or a low beam, as desired.

Referring now to the form of the invention shown in Figures 11 to 23, and particularly to the construction of the right headlamp as shown in Figures 11 to 17, 10 indicates the lamp housing within which is suitably mounted a plain parabolic reflector 12 equipped with a two filament bulb having the lower filament 14 at the focus of the reflector and the upper filament 15 approximately 9/64" above focus. Over the front of the reflector we have shown a special lens 16 provided with horizontal prisms. The prisms 17, 17' and 18, 18' at the top and bottom, respectively, are preferably of greatest strength, while the prisms 19 overlying the center of the reflector are of less strength. The prisms 20 at the sides of the lens are also very light. One example of arrangement of prisms is given on the drawing but this may be considerably varied in practice. For example, if desired, the prisms may be made alternately light and heavy, following however the general principle of lighter prisms over the center of the lamp. It will be noted that the prisms are preferably given a slight curvature in vertical section to overlap and blend the light from adjacent prisms.

We have indicated the upper segment of the headlamp by the character U, the intermediate segment by the character I, and the lower segment by the character L. We have shown the upper segment including the prisms 17 and 17', and the corresponding portion of the reflector, the intermediate segment including the prisms 19 and 20 and the corresponding portions of the reflector, and the bottom segment including the prisms 18 and 18' and the corresponding portions of the reflector. Actually there is no abrupt separation of one segment from the other for the curvature of the prisms blends together the light from adjacent portions of the lamp. However, the division of the lamp into segments as shown is substantially correct and serves to illustrate the essential principle involved in its design.

The light projected from the sides of the intermediate segment passing through prisms 20 forms the top of the beam. These prisms may be dispensed with by providing for the aiming of the headlamp so that substantially none of the rays go above the horizontal. However, it is usually preferable to place light prisms on these portions of the lens to avoid the necessity of having the lamps normally occupy a downwardly tilted position.

The light from the upper and lower segments is directed by prisms 17, 17' and 18, 18' toward the bottom of the beam, while the light from the center of the intermediate segment is directed to an intermediate position between the light from the sides and the light from the top and bottom by means of prisms 19.

The optical principles involved in the design as so far described are (1) that the portions of the reflector i. e., the top and bottom portions, the rays of light from which are but slightly affected in vertical aim upon shifting from a filament at focus to one slightly above focus are provided with prisms to throw the rays toward the bottom of the composite beam so that the top of the beam is obtained from portions of the reflector that tilt the rays downwardly upon shifting to the upper filament; and (2) the center of the reflector is provided with prisms, to throw the light below the light from the side portions, this being done because the center light is very sensitive to variations in filament positioning and would, in case of manufacturing inaccuracies, be likely to be projected above the horizontal and cause glare. All of this is part of the prior art, and is a conventional method of securing a depressed beam by going from the lower filament to the upper filament.

We have employed the term "segment" to cover a portion of the reflector together with the portion of the lens overlying it for the reason that bending of light rays may always be accomplished either by the lens alone, by the reflector alone, or by a combination of the two, it being well recognized among experts in this field that the bending of a portion of the reflector or the employment of prisms are optically equivalent ways of accomplishing the same redirection of rays. The term "segment" is likewise used in connection with the other forms of the invention where either a special reflector alone is used, or where a special reflector is used with a lens to produce the same optical results.

In the lenses shown in Figures 11 to 23, prisms are applied to one face of the lens, while the other face is occupied by vertical flutes. Obviously, if preferred, the flutes and prisms can be together on the inside or outside of the lens.

In Figure 15 we have shown the symmetrical flutes 4 employed on the top and bottom portions of both lenses. These flutes spread the light across the full width of the road in accordance with present day headlamp design. The flutes may be varied in width and radius of curvature so as to secure the desired overlapping and blending of the bundles of rays.

In Figure 16, we have shown the asymmetrical flutes 6 employed over the portions of the lens adjacent the top and bottom portions, to throw the light to the left of the road.

In Figure 17 we have shown the shallow asymmetrical flutes 5 employed over the sides of the central zone of the lens and the heavier asymmetrical flutes 7 used over the center of the lens. By employing shallow flutes over the side the light is spread but little so that a concentration of light is obtained at the top of the beam. We have also preferably placed a few shallow symmetrical flutes 8 over the sides of the lens spreading the light a few degrees to right and left of the centerline, thereby increasing the intensity down the center of the road.

The asymmetrical flutes 5, 6 and 7 are greater than half flutes as shown in Figure 16A so as to spread a portion of the rays to the right of the centerline but spreading the bulk of the rays to the left. The amount of spread to the right is preferably from 1° to 5° so as to overlap the light projected to the top of the beam by the left headlamp.

There may be considerable variation in the design and location of the flutes, the object being to blend the rays together to form a smooth beam. Thus, as pointed out above, a few symmetrical flutes may be interspersed among the asymmetrical flutes and in some cases it may be satisfactory to mix in a few oppositely facing asymmetrical flutes. Likewise it may prove desirable to intersperse a few asymmetrical flutes among the symmetrical flutes at the top or bottom of the lamp. In general, however, in the case of each of the lamp designs herein disclosed the greater proportion of the flutes in each of the horizontal bands or zones of the lamp should be either symmetrical or asymmetrical, and if asymmetrical, should have their high sides extending toward the same side of the lens.

The beam patterns produced by the right headlamp just described are illustrated in Figures 25 and 27. In all of the beam patterns illustrated the center line marked zero degrees represents the axis of both the right and left-hand lamps. It can be safely assumed that the axes of both lamps are coincident at infinity due to the fact that the separation at this point is negligible. For example, headlamps 21" apart subtend an angle of 1° at one hundred feet, and one-tenth degree at one thousand feet. One-tenth degree is a negligible quantity in head-lamp design, operation and manufacture. Figure 25 shows the beam produced by the lower filament, and Figure 27 the beam produced by the upper filament. The widest portion 40 of the beam pattern is projected by the part of the lamp covered by the symmetrical flutes 4. The narrow band 50 at the top of the left side of the pattern is projected by the sides of the intermediate segment. The deeper asymmetrical portion 60 of the beam pattern is projected by the remainder of the lamp. Actually there are no such lines of demarcation between parts of the beam pattern as are indicated on these views for it is one of the principal objectives of the designer to produce smooth beams of graduated intensity. However, the beam pattern drawings serve to illustrate nicely the underlying principles of the design.

The lens of the left lamp shown in Figures 18 to 23 is substantially identical with that of the right lamp, except for the design of the asymmetrical flutes.

In Figure 22 we have shown the deep asymmetrical flutes 6' employed over the portions of the lens next to the top and bottom portions.

In Figure 23 we have shown the lighter asymmetrical flutes 5' provided over sides of the intermediate segment of the lamp, and the heavier asymmetrical flutes 7' over the center of the lamp. Flutes 7' are preferably so designed as to throw light further to the right than flutes 5' for the center of the lamp is more sensitive to inaccuracies in filament positioning and is more likely therefore to throw light to the left of the centerline where it would cause glare.

If desired a few very shallow symmetrical flutes may be used on the central segment of the lens to direct light straight down the road with very slight spread, as in the case of the flutes 8 of the right hand lens. While this light would tend to cause glare in the passing beam, the amount so directed would be so slight as to be negligible from the glare standpoint.

It will be noted that the asymmetrical flutes 5', 6' and 7' spread light to the right of the road only, as indicated in Figure 22A.

The beam patterns produced by the left headlamp are illustrated in Figures 24 and 26. Figure 24 indicates the beam produced by the lower filament, and Figure 26 the beam produced by the upper filament. The widest portion 40' of the beam pattern is projected by the part of the lamp covered by the symmetrical flutes, these flutes being identical in design and arrangement with the flutes of the lens of the right headlamp.

The asymmetrical band 50' at the top of the pattern is projected by the sides 20 of the intermediate segment of the lamp covered by the shallow asymmetrical flutes 5'.

The deeper asymmetrical band 60' which overlaps and blends together the beams 40' and 50' is projected by the remainder of the lamp.

In Figure 28 we have shown the beam pattern produced by the lower filaments of both lamps. This beam extends to the cut-off line H, and is used for high speed country driving.

In Figure 29 we have shown the beam pattern produced by the upper filaments of both lamps. This corresponds to the lower beam of present day headlamps, and may be used for city driving.

In Figure 30 we have shown the beam pattern produced by the lower filament of the left headlamp and the upper filaments of both headlamps. This makes a desirable beam for passing in the country. The beam contains more light on the right side than on the left side owing to energization of both filaments in the left headlamp.

In Figure 31 we have shown the beam pattern produced by the upper filament of the right headlamp, and the lower filament of the left headlamp.

It will be noted that both of the beams just described are asymmetrical, being lower on the left side than on the right side, thereby avoiding the projection of glaring rays into the eyes of an approaching driver. This safety effect is increased also by the fact that the light at the right side of the beam is projected by the left headlamp.

Attention is again called to the fact that while the asymmetrical part of the beam from the left headlamp is confined to the right side of the road the asymmetrical part of the beam from the right headlamp extends about 2° or 3° over onto the right side of the road. As previously pointed out, this overlapping, which may vary from 1 to 5°, is essential in order to place the light of the highest intensity down the center of the road. Actually, as indicated on the beam patterns, the point of highest intensity is slightly to the right of the center, the light distribution being substantially that shown in Figure 10.

It will be noted in the beams shown in Figures 30 and 31 that the narrow hot spot from the side portion of the left lamp is separated from the main part of the beam by an area that is not strongly illuminated. This condition may be improved, and a better blending of beams obtained in any one of the following ways:

A portion of the top or bottom segments, or both of the left lamp can be selected which has relatively no tilt, and the light from these sections placed with the top approximately 1° below horizontal.

Or a portion of the light from either or both the top and bottom half of either or both the left hand and right hand lamps may be spread from center to the right. When using the lower filaments or upper beams the top of the light from these portions should be directed approximately horizontally, and the portions should be so selected that when shifting to the upper filament, or lower beam, the top will tilt approximately 1°.

Or the hot spot from the left lamp, or from both lamps may be thickened or deepened to approximately 2½° by the use of curved prisms over the sides of the reflector, or by suitably shaping these portions of the reflector.

Substantially the same distribution of light shown in Figures 24 to 31 may also be obtained by the use of a special reflector shaped to produce much the same optical effect as is obtained by the use of the prisms on the lenses of Figures 11 to 23. We have illustrated such a design in Figures 32 to 40. Here 30 indicates a reflector which may be of the well known "Tiltray" design having upper zone 32 and lower zone 34 tilted downwardly to project the corresponding rays below the top of the beam produced by the focal filament.

The dotted lines indicate the outline of a corresponding true parabola having a horizontal axis. While the center of the intermediate zone of the reflector may be tilted to project the light below the light from the side portions, in a "Tiltray" reflector a somewhat similar effect is obtained by axially offsetting the top and bottom portions of the reflector. Thus F1 indicates the focus of the upper half of the reflector while F2 indicates the focus of the lower half of the reflector. The lower filament 14 and the upper filament 16 are arranged between the foci, as illustrated.

Figure 37:
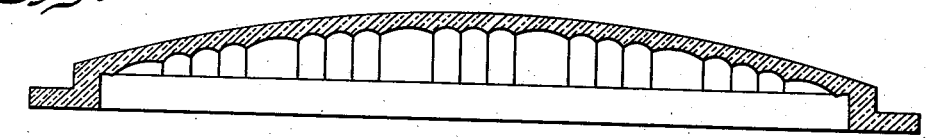

In this design the symmetrical flutes are confined to the bottom segment of the lamp as shown in Figure 37. The remainder of the lens of the right headlamp is provided with fractional flutes shown in Figures 34 to 36 projecting some of the light as far as from 1° to 5° to the right of the road but most of the light to the left of the road.

Referring to Figure 35 it will be noted that the half flutes at the left of the center are of somewhat greater angle than correspondingly located flutes at the right. This is necessary because the light source is ahead of the focus of the upper part of the reflector, thereby causing the rays striking the left side of the reflector to be directed further toward the right and causing the rays striking the right side to be directed further toward the left than would be the case if the source were on focus. The described arrangement of half flutes makes the necessary correction, the heavier flutes on the left directing the light further toward the left while the flutes on the right are of sufficiently reduced angle to offset the left-bending effect of the out of focus position of the filament.

Figure 36 shows the flutes over the lower half of the central zone of the lens. Here the arrangement is reversed, the flutes at the right of the center being of somewhat greater angle than the corresponding flutes at the left. This is necessary because the light source is behind the focus of this part of the reflector causing the rays striking the left side of the reflector to be directed further toward the left and causing rays striking the right side of the reflector to be directed further toward the right than would be the case if the source were on focus. With our design the flutes on the left side of the lens are of sufficiently reduced angle to offset the left-bending effect of the out of focus position of the filament while the heavier flutes on the right direct the rays further to the left to overcome the right-bending effect of the out of focus position of the filament.

Referring now to the beam patterns of Figures 25 and 27, the symmetrical band 40 is projected by the bottom segment of the lamp. The asymmetrical band 50 is projected by the sides of the intermediate segment of the lamp. The asymmetrical band 60 is projected by the remainder of the lamp.

The lens of the left lamp is substantially the same as that of the right lamp, except for the design of the flutes in the top and intermediate segments, these being reversed and arranged to project no light to the left of the centerline. The details of the flutes are shown in Figures 38 to 40.

In both Figures 39 and 40, it will be noted that the shallower flutes are at the sides of the segment to concentrate the light at the top of the beam. Flutes of greater curvature are used over the center of the lamp because the filament images from this portion of the reflector are of greater size, contain more light, and are more sensitive to filament placement. Because the filament is ahead of focus of this part of the reflector, the flutes at the right of Figure 39 are heavier than the corresponding flutes at the left for the reasons previously explained. Similarly the flutes at the left of Figure 40 are heavier than the correspondingly located flutes at the right, since the filament is behind focus.

Referring now to the corresponding beam patterns shown in Figures 24 and 26, the portion 40' of the beam pattern is projected by the bottom segment of the headlamps; the hot spot 50' is projected by the sides of the intermediate segment, and the portion 60' is projected by the remainder of the lamp.

The same combination of beams may be produced as in the case of the first form of the invention.

This last described design may, if desired, be modified by providing the top part of the upper segment of the lamp with symmetrical flutes instead of asymmetrical flutes, thereby increasing the amount of light spread across the width of the road. However, doing so reduces the amount of the light projected down the center of the road, and we prefer the arrangement shown.

In Figures 41 to 43 we have shown the method of obtaining the same illumination by means of a properly shaped reflector. The reflector is of the same design as that of Figure 32, the top and bottom portions being tilted downwardly and the upper half of the reflector being offset axially with respect to the lower half, but in addition the top and bottom portions are provided with full flutes 51 while the intermediate segment is provided with unsymmetrical fractional flutes 53.

We have shown the left headlamp. The right headlamp will differ from it only in the use of flutes on the central portion of the reflector projecting light to the left instead of to the right just as in the case of the left headlamps of previous designs.

The overlapping feature of our invention may likewise be employed in the case of headlamps, one of which projects all of its rays on the right side of the road, and the other of which projects the bulk of its rays to the left side of the road and a small portion from 1° to 5° to the right, thereby overlapping the beams. This may be accomplished by replacing the symmetrical flutes in each of the designs shown by asymmetrical flutes such as are provided on the remainder of the lamp. However, we prefer the arrangement shown.

Our invention is susceptible of a great deal of modification in practice by applying expedients well known to lighting engineers. Thus the sources of light at and above focus may be provided either by independent filaments or by a single filament shifted by the operator from one location to the other in accordance with the light distribution desired.

All of the designs of reflectors and lenses herein disclosed are subject to considerable variation in the arrangement of flutes and prisms as previously pointed out in this specification in accordance with individual preferences as to details of light distribution.

It will also be understood that in addition to the designs illustrated and described in this application there are many hybrids that may be employed. For example, part of the down-bending of the rays may be done by the reflector and part by the lens; or part of the lateral redirection of rays may be done by the reflector and part by the lens, etc. But it will be apparent that such modifications are but matters of choice among lighting engineers and do not in themselves constitute departure from the spirit of this invention.

We claim:

1. A lens for automobile headlamps comprising top, bottom and central zones, said lens being provided with down-bending prisms, the prisms overlying the top and bottom zones being of greater angle than the prisms overlying the central zone, said central zone being provided with substantially vertical asymmetrical flutes having the high sides thereof extending toward the same edge of the lens, a portion of one of the other zones remote from the central zone being provided with substantially vertical symmetrical flutes, the remaining portion of said last-named zone being provided with a series of substantially vertical asymmetrical flutes having the high sides thereof extending toward the same edge of the lens as the flutes on the central zone.

2. A lens for automobile headlamps comprising top, bottom and central zones, said lens being provided with down-bending prisms, the prisms overlying the top and bottom zones being of greater angle than the prisms overlying the central zone, and the prisms on the central portion of the central zone being of greater angle than the prisms on the sides of the central zone, said central zone being provided with substantially vertical asymmetrical flutes having the high sides thereof extending toward the same edge of the lens, the asymmetrical flutes over said central portion being of greater curvature than the asymmetrical flutes over the remainder of said central zone, a portion of one of the other zones remote from the central zone being provided with substantially vertical symmetrical flutes, the remaining portion of said last-named zone being provided with a series of substantially vertical asymmetrical flutes having the high sides thereof extending toward the same edge of the lens as the flutes on the central zone.

3. A lens for automobile headlamps comprising top, bottom and central zones, said lens being provided with down-bending prisms, the prisms overlying the top and bottom zones being of greater angle than the prisms overlying the central zone, the lower portion of said bottom zone and the upper portion of said top zone being provided with substantially vertical symmetrical flutes, the remainder of said top and bottom zones and the central zone being provided with a series of substantially vertical asymmetrical flutes having the high sides thereof extending toward the same side of the lens.

4. A lens provided with vertical flutes, substantially all of the flutes over the lower part of the lower half of the lens being symmetrical while substantially all of the flutes over the remainder of the lens are asymmetrical, having their high sides extending toward the same side of the lens to direct light toward one side only.

5. A pair of headlamps adapted to be mounted at the front of a vehicle to light the roadway, one of said headlamps comprising light projecting means including a concave light concentrating reflector and a glass closure, means providing a source of light adjacent the focal region of the reflector or at a point above the focal region, said light projecting means being subdivided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said upper and lower zones being formed to direct the rays falling upon them beneath the top of the beam produced when the lower source is energized, whereby, upon changing to the upper source, an effective lowering of the beam is secured, said intermediate zone being provided with means for directing light to form the left half of the upper portion of the combined high beam produced by the two headlamps, and with means for directing light to the right of the center line to an extent to bring the portion of the beam of highest intensity along the center line, the other headlamp comprising light projecting means including a substantially parabolic reflector, a glass closure, and a light source adjacent the focal region of the reflector, said light projecting means including means for directing light into the right half only of the upper portion of the combined beam pattern, means for energizing said last-named light source simultaneously with one or the other of the first-named sources, the energization of the second-named focal source together with the first-named focal source producing a substantially symmetrical beam, and the energization of the second-named focal source together with the source above focus producing an asymmetrical beam higher on one side than on the other for use as a passing beam.

6. In the combination as defined in claim 5, each of said light projecting means being provided with means for spreading light in the lower part of the beam on both sides of the center line.

7. A pair of headlamps adapted to be mounted at the front of a vehicle to light the roadway, each of said headlamps comprising light projecting means including a concave light concentrating reflector and a glass closure, and means providing a source of light adjacent the focal region of the reflector or at a point above the focal region, each of said light projecting means being subdivided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said upper and lower zones being formed to direct the rays falling upon them beneath the top of the beam produced when the lower source is energized, whereby, upon changing to the upper source, an effective lowering of the beam is secured, the intermediate zone of one of said headlamps being provided with means for directing light to form the left half of the upper portion of the combined high beam produced by the two headlamps, and with means for directing light to the right of the center line to an extent to bring the portion of the beam of highest intensity along the center line, the intermediate zone of the second headlamp being provided with means for directing light into the right half only of the upper portion of the combined beam pattern, means for energizing both focal sources to produce a high beam, means for energizing both sources above focus for producing a low beam, and means for energizing the above focus source of the first mentioned headlamp in combination with the focal source of the second headlamp to produce a composite beam higher on the right side than on the left.

8. In the combination as defined in claim 7, one of the other zones of each of said headlamps being provided with means for directing light to both sides of the center line to illuminate the full width of the road.

9. A headlamp for automobiles comprising light projecting means including a substantially parabolic reflector, and a cover glass, said reflector having the focus of its lower portion in advance of the focus of its upper portion, a light source between the foci, said light projecting means including means extending on both sides of the horizontal lamp diameter for deflecting light to one side of the center line, said light deflecting means above the diameter being of greater power on the side toward which light is deflected than on the other side, while the light deflecting means below the horizontal lamp diameter being of less power on the side toward which light is deflected than on the other side so as to correct for horizontal dispersion resulting from displacement of the light source with respect to the foci.

HOWARD C. MEAD.
CLARENCE A. MICHEL.